(12) United States Patent
Tanaka

(10) Patent No.: US 6,886,949 B2
(45) Date of Patent: May 3, 2005

(54) LIGHT REFLECTIVE FILMS

(75) Inventor: Hajima Tanaka, Oxford, AL (US)

(73) Assignee: YKK Corporation of America, Marietta, GA (US)

( * ) Notice: Subject to any disclaimer, the term of this patent is extended or adjusted under 35 U.S.C. 154(b) by 0 days.

(21) Appl. No.: 10/370,228

(22) Filed: Feb. 19, 2003

(65) Prior Publication Data
US 2004/0160671 A1 Aug. 19, 2004

(51) Int. Cl.⁷ .............................. G02B 5/12; G02B 5/128
(52) U.S. Cl. ...................... 359/515; 359/536; 359/538; 359/540; 359/541
(58) Field of Search ................... 359/515, 529, 359/530, 534–542, 546, 584; 428/221, 323, 327

(56) References Cited

U.S. PATENT DOCUMENTS

| | | | |
|---|---|---|---|
| 4,725,494 A | * | 2/1988 | Belisle et al. ............... 428/325 |
| 5,621,571 A | * | 4/1997 | Bantli et al. ................ 359/529 |
| 5,637,173 A | | 6/1997 | Martin et al. |
| 5,728,448 A | | 3/1998 | Okeya et al. |
| 5,805,339 A | | 9/1998 | Martin et al. |
| 5,956,818 A | | 9/1999 | Tsubata |
| 5,984,479 A | * | 11/1999 | Ochi et al. .................. 359/539 |
| 6,114,011 A | | 9/2000 | Martin et al. |
| 6,180,545 B1 | | 1/2001 | Okeya et al. |

FOREIGN PATENT DOCUMENTS

| | | |
|---|---|---|
| JP | 50-53661 | 5/1975 |
| JP | 59-157819 | 10/1984 |
| JP | 8-309929 | 11/1996 |

* cited by examiner

Primary Examiner—James Phan
(74) Attorney, Agent, or Firm—Michael S. Leonard; Everest Intellectual Property Law Group

(57) ABSTRACT

A light reflective film having a multi-layered structure including a light reflective membrane layer on a web. A plurality of transparent spherical glass beads are provided on the light reflective membrane layer. A transparent film layer is provided on the glass beads and is spaced away from the light reflective membrane layer by an air gap. A transparent coating encapsulates all of the component layers to form the light reflective film. The light reflective film is flexible and durable, and effectively reflects light when under water.

22 Claims, 1 Drawing Sheet

LIGHT REFLECTIVE FILMS

BACKGROUND OF THE INVENTION

The present invention generally pertains to light reflective films. More specifically, the present invention pertains to multi-layered structures having a light-reflective material in which the multi-layered structures are encapsulated with a transparent coating. The present invention can provide light reflective devices which effectively reflect light, even when wet, and are highly flexible. In an embodiment, the present invention pertains to a flexible film or fabric having a multi-layered, light-reflective structure on a web in which the structure and the web are encapsulated with a flexible coating.

Devices which reflect light are known, including reflective tapes. However, needs exist for improved light reflecting devices, and existing reflective tapes can be improved.

FIG. 1 shows a cross-section of an existing reflective tape 10, which is an open-type reflective tape. The open-type reflective tape 10 has a base sheet 12 which reflects light. The open-type reflective tape 10 also has clear glass spherical beads 14 on the reflective base sheet 12. The glass spherical beads 14 are bare and exposed to the surrounding environment. Also, portions of the reflective base sheet 12 between the glass spherical beads 14 are exposed to the surrounding environment.

Although the open-type reflective tape 10 reflects light, the open-type reflective tape 10 can have disadvantages. The glass spherical beads 14 are bare and exposed to the environment. The glass spherical beads 14 are susceptive to the environmental elements because the beads 14 are exposed. The exposed structure of the glass spherical beads 14 can hinder light reflection by the open-type reflective tape 10. For example, when the open-type reflective tape 10 becomes wet, such as when used in water or rain, the ability of the open-type reflective tape 10 to reflect light can be significantly reduced or even effectively eliminated. Similarly, the exposed portions of the reflective base sheet 12 are susceptive to the environmental elements which can hinder light reflection.

FIG. 2 shows a cross-section of another existing reflective tape 16, which is a closed-type reflective tape. The closed-type reflective tape 16 has a base sheet 18 which reflects light and clear glass spherical beads 20. The glass spherical beads 20 are completely, tightly coated with plastic resin 22. Also, the plastic resin 22 contacts and covers the light reflective base sheet 18. The plastic resin 22 of the closed-type reflective tape 16 may protect the glass spherical beads 20 from the elements of the surrounding environment.

However, the closed-type reflective tape 16 can have disadvantages. Particularly, the closed-type reflective tape 16 can have reduced ability to reflect light. The light reflective base sheet 18 is covered by and in contact with the plastic resin 22. There is no air space immediately above the light reflective base sheet 18. The plastic resin 22 covering and in contact with the base sheet 18 tends to reduce the light-reflective ability of the closed-type reflective tape 16. Also, the plastic resin 22 has a relatively high thickness to cover the glass spherical beads 20. The thickness of the plastic resin 22 tends to darken the plastic resin 22 and reduce its clearness or ability to permit light transmission. Accordingly, the light-reflectiveness of the closed-type reflective tape 16 is reduced. When water contacts the closed-type reflective tape 16, the light reflection is reduced even further. Furthermore, the thickness of the plastic resin 22 stiffens the closed-type reflective tape 16 which reduces the tape's flexibility.

FIG. 3 shows a cross-section of another existing reflective tape 24, which is a capsule-type reflective tape. The capsule-type reflective tape 24 has a base sheet 26 and clear glass spherical beads 28. The base sheet 26 forms posts 30 between various glass spherical beads 28. Only one post 30 is shown in FIG. 3; however, numerous posts 30 extend upward above the glass spherical beads 28. A plastic film 32 is bonded to the tops of the posts 30. The posts 30 provide a gap 34 between the plastic film 32 and the glass spherical beads 28.

The capsule-type reflective tape 24 may provide increased light reflectiveness compared to the closed-type reflective tape 16 (FIG. 2). However, the capsule-type reflective tape 24 can have disadvantages. The posts 30 of the capsule-type reflective tape 24 increase the rigidity of the tape 24. Thus, the capsule-type reflective tape 24 has reduced flexibility.

The open-type reflective tape 10, closed-type reflective tape 16, and capsule-type reflective tape 24 can exhibit further disadvantages. For example, existing reflective tapes tend to have low surface protection and low abrasive resistance. Accordingly, objects can contact and damage the tapes which reduces the effectiveness of light reflection. Use of existing tapes in cold temperatures or cold weather tends to reduce the flexibility of the tapes. Also, existing tapes have significantly lower light reflection in wet environments.

Accordingly, for the reasons mentioned above and for other reasons, light reflective tapes can be improved. For example, one improvement would be to provide a light reflective film that reflects light very well and is flexible.

Existing light reflective tapes can also be found in U.S. Pat. Nos. 5,637,173; 5,728,448; 5,805,339; 5,956,818; 6,114,011; and 6,180,545 B1; and Japanese Patent Application Nos. S48-103559 (Japanese Publication No. S50-53661); H07-144163 (Japanese Publication No. H08-309929); and S58-51359 (Japanese Publication No. S59-157819).

SUMMARY OF THE INVENTION

Light reflective films or devices are provided by the present invention. One light reflective film has a multi-layered structure including a light reflective membrane layer on a web. A plurality of transparent objects or transparent spherical glass beads are provided on the light reflective membrane layer. A transparent film layer is provided on the transparent objects and is spaced away from the light reflective membrane layer by an air gap. A transparent coating encapsulates all of the component layers to form the light reflective film. The light reflective film is flexible, durable, and effectively reflects light when used in various environmental conditions, including cold temperatures and when covered with water.

Light reflective films of the present invention can be used for a wide variety of applications. For example, the light reflective films can be attached to any object as desired to provide a light reflective device. Examples of a few applications of the present light reflective film invention include, but are not limited to, fabrics, clothing, apparel, belts, signs, safety devices, animal leashes and collars, and any other applications where reflecting light may be desired.

The term "retroreflective" is also used to describe the present invention and means light reflective. Various components of the light reflective films of the present invention are described and claimed as being transparent. Of course, transparency is desired to avoid reducing the effectiveness of light reflection. However, complete and absolute transparency is not required according to the present invention. Thus, transparent components of the light reflective films include components which have reduced transparency but are still suitable for effective retroreflection according to the present invention. Substantially transparent components are also considered to be transparent components in the light reflective films.

In an embodiment, a light reflective film has a light reflective layer, a plurality of transparent objects on the light reflective layer, a transparent film layer in contact with the plurality of transparent objects and spaced away from the light reflective layer, and a coating layer covering the transparent film layer.

The coating layer may completely encapsulate the light reflective film. The transparent film layer is, preferably, spaced away from the light reflective layer by an air gap. The height of the air gap is defined by the plurality of transparent objects. The light reflective film is preferably flexible, but could have varying degrees of flexibility or can even be rigid. The coating layer can be a polyurethane material. Also, the coating layer can have a lower melting temperature than the transparent film layer. Examples of materials which can be used for the web layer include polyester materials, nylon materials, woven materials, and non-woven materials. Examples of materials which can be used for the transparent film layer include polyester materials, nylon materials, and polyvinyl chloride materials. An example of materials which can be used for the coating layer is a polyurethane material. The light reflective film of the present invention can be attached to another object for use.

In another embodiment, a retroreflective device has a web layer, a retroreflective layer on the web layer, a plurality of transparent objects on the retroreflective layer, a transparent film layer on the plurality of transparent objects and spaced away from the retroreflective layer by a gap, and a coating layer enclosing the web layer, the retroreflective layer, the plurality of transparent objects, the gap, and the transparent film layer.

The coating layer of the retroreflective device can completely encapsulate the retroreflective device. The gap can be an air gap. The transparent film layer can be supported by the plurality of transparent objects away from the retroreflective layer. Preferably, the retroreflective device is flexible. An example of the materials of the coating layer for the retroreflective device is a polyurethane material. The coating layer can have a lower melting temperature than the transparent film layer. The web layer can be a polyester material, nylon material, woven material, or non-woven material, for example. The transparent film layer can be a polyester material, nylon material, or polyvinyl chloride material, for example. The coating layer can be a polyurethane material, for example. The retroreflective device can be attached to another object for use.

In another embodiment, a flexible light reflective device has a web layer, a light reflective layer on the web layer, a plurality of transparent beads on the light reflective layer, a transparent film layer in contact with the plurality of transparent beads and spaced away from the light reflective layer by an air gap, and a coating layer encapsulating the light reflective device.

One advantage of the present invention is to provide improved light reflective devices.

Another advantage of the present invention is to provide improved light reflective films which are flexible.

Another advantage of the present invention is to provide highly reflective films which have protection against the environment.

Yet another advantage of the present invention is to provide light reflective devices which have high retroreflection when wet.

A further advantage of the present invention is to provide retroreflective films which have surface protection for the light reflective film.

An even further advantage of the present invention is to provide retroreflective devices which are flexible in cold temperature conditions.

Additional features and advantages of the present invention are described in, and will be apparent from, the following Detailed Description of the Invention and the figures. The features and advantages may be desired, but, are not necessarily required to practice the present invention.

DETAILED DESCRIPTION OF THE INVENTION

The present invention provides new light reflective devices. An example of the present invention will be described in an embodiment of a flexible light reflective film. However, the present invention can be practiced in many different embodiments.

Figure 1:
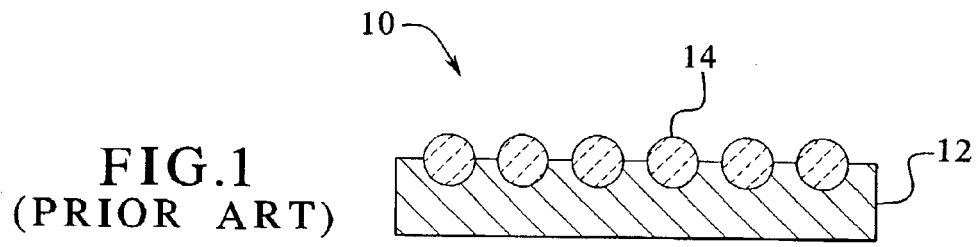
FIG. 1 is a cross-sectional view of an existing open-type reflective tape.
Figure 2:
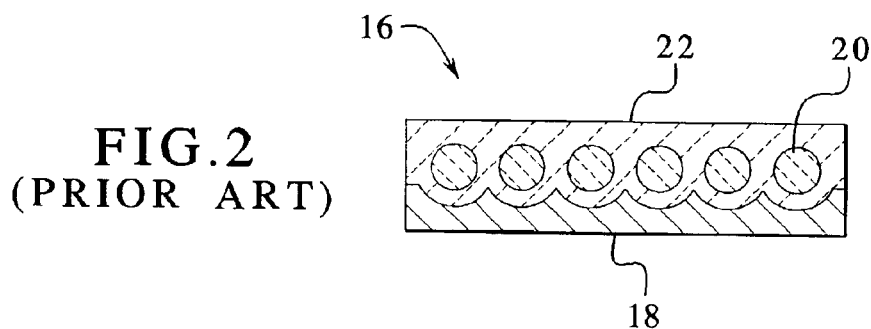
FIG. 2 is a cross-sectional view of an existing closed-type reflective tape.
Figure 3:
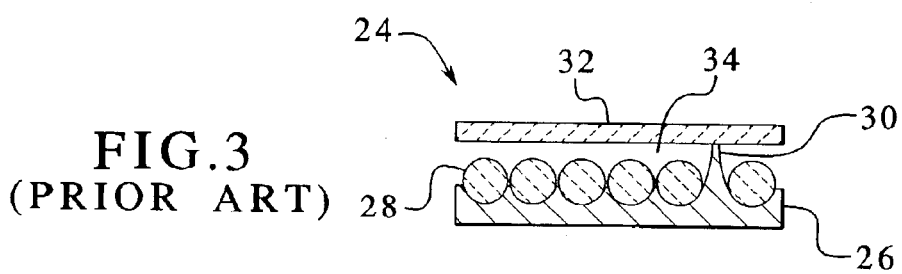
FIG. 3 is a cross-sectional view of an existing capsule-type reflective tape.
Figure 4:
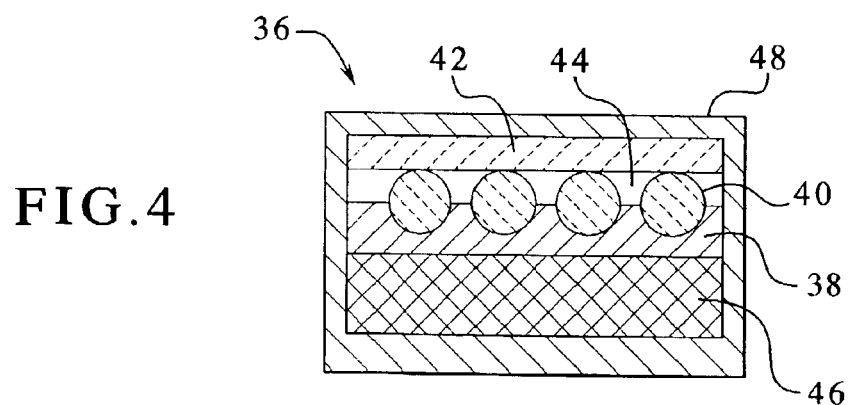
FIG. 4 is a cross-sectional view of a light reflective film according to the principles of the present invention.

An example of the present invention is shown in FIG. 4, which is a cross-sectional view of a flexible light reflective film 36. The light reflective film 36 has a light reflective membrane layer 38. The light reflective membrane layer 38 reflects light. Preferably, the light reflective membrane layer 38 is flexible. The light reflective membrane layer 38 can be made of any suitable material which reflects light or is treated or coated with a light reflective material. The light reflective membrane layer 38 could also be made of a light emitting material, such as a glow-in-the-dark material, for example. If flexibility is not necessarily desired for a particular embodiment of the present invention, then the light reflective membrane layer 38 need not be flexible.

A plurality of transparent objects 40 are provided on the light reflective membrane layer 38. The plurality of transparent objects 40 permit light to pass through the objects and reflect back from the light reflective membrane layer 38. The plurality of transparent objects 40 tend to act like optical lenses and enhance the visibility or light reflectability of the light reflective film 36. The light reflective film 36 can be more noticeable by including the transparent objects 40. If desired, the objects 40 may have a light reflective outer surface or coating.

The plurality of transparent objects 40 are shown in FIG. 4 as being partially embedded into the light reflective membrane layer 38. The amount of distance that the transparent objects 40 are embedded into the light reflective membrane layer 38 can be varied, as desired. However, it is preferable that the transparent objects 40 are not completely embedded into the light reflective membrane later 38 and protrude above the light reflective membrane layer 38. The transparent objects 40 could be positioned completely on top of the light reflective membrane layer 38 without being embedded into the light reflective membrane layer 38.

Preferably, the transparent objects 40 are a plurality of spherical glass beads. The spherical glass beads 40 are solid and transparent. However, transparent objects having other shapes, made of other materials, and being solid or hollow can be used with the present invention.

A flexible, transparent film layer 42 is provided on the plurality of transparent objects 40. The transparent film layer 42 is spaced away from the light reflective membrane layer 38 by a gap 44. The gap 44 permits light transmission and, preferably, is simply an air space above the light reflective membrane layer 38. The gap 44 significantly increases the retroreflection of the light reflective film 36. FIG. 4 shows the transparent film layer 42 in contact with the plurality of transparent objects 40 as laying on top of the transparent objects 40. However, the transparent objects 40 could be partially embedded into the bottom side of the transparent film layer 42, as long as the gap 44 remains above the light reflective membrane layer 38.

The transparent film layer 42 can be made of materials including polyester, nylon, or polyvinyl chloride (PVC), for example. Other suitable materials can be used for the transparent film layer 42 which permit light transmission. Preferably, the material used for the transparent film layer 42 is flexible. However, if flexibility is not necessarily desired for a particular embodiment of the present invention, then the transparent film layer 42 need not be flexible.

The embodiment of the light reflective film 36 shown in FIG. 4 preferably includes a web layer 46. The web layer 46 is flexible and provides strength and dimensional stability to the light reflective film 36. The light reflective membrane layer 38 can be laminated onto the web layer 46 or bound to the web layer 46 by any suitable means, for example, by an adhesive. Examples of suitable materials which can be used for the web layer 46 include, polyester materials, nylon materials, woven materials, and non-woven materials, etc. Other materials which provide strength to the light reflective film 36 could also be used for the web layer 46. The web layer 46 is optional and not necessarily required to practice the present invention.

The light reflective film 36 has a coating layer 48 which covers the transparent film layer 42. Preferably, the coating layer 48 surrounds all of the other layers (web layer 46, light reflective membrane layer 38, transparent objects 40, gap 44, and transparent film layer 42) and encapsulates the other layers. The coating layer 48 is transparent to permit light transmission. Also, the coating layer 48 is flexible, but, can have reduced flexibility or can be inflexible, if desired. One material which can be used for the coating layer 48 is polyurethane. However, other suitable materials can be used for the coating layer 48. Some examples of other suitable materials for the coating layer 48 include polycarbonates, polystyrenes, polymethyl methacrylates, acrylics, and polypropylenes. The coating layer 48, as shown in FIG. 4, encloses the other layers and advantageously provides a uniform, multi-layered light reflective film 36. Preferably, the coating layer 48 has a lower melting temperature than the other layers such that the coating layer 48 can be applied without affecting the other layers.

The coating layer 48 maintains the flexibility of the light reflective film 36 and provides the light reflective film 36 with great durability. Flexibility and durability of the light reflective film 36 is maintained during various environment or weather conditions, including cold weather or temperatures. Also, the coating layer 48 provides the light reflective film 36 with effective retroreflection when wet or under water. The coating layer 48 further protects the enclosed layers, such as the light reflective membrane layer 38 and the plurality of transparent objects 40, from the elements of the environment. The coating layer 48 provides surface protection and abrasion resistance to the retroreflective materials and other components of the light reflective film 36. Accordingly, the retroreflective devices of the present invention can significantly provide durable, flexible, and highly retroreflective devices which can be effectively used in a variety of environmental conditions.

The light reflective films of the present invention can be used in a wide variety of applications. The light reflective films can be attached to other objects as desired to provide retroreflective devices. The light reflective films can have any shape or configuration as desired, including flat, planer shapes and contoured, non-planer shapes.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A light reflective film, comprising:
   a light reflective layer;
   a plurality of transparent objects on the light reflective layer;
   a transparent film layer in contact with the plurality of transparent objects and spaced away from the light reflective layer by an air gap; and
   a coating layer covering the transparent film layer.

2. The light reflective film of claim 1, wherein the coating layer completely encapsulates the light reflective film.

3. The light reflective film of claim 1, wherein a height of the air gap is defined by the plurality of transparent objects.

4. The light reflective film of claim 1, wherein the light reflective film is flexible.

5. The light reflective film of claim 1, wherein the coating layer is a material selected from the group consisting of polyurethane materials, polycarbonate materials, polystyrene materials, polymethyl methacrylate materials, acrylic materials, and polypropylene materials.

6. The light reflective film of claim 1, wherein the coating layer has a lower melting temperature than the transparent film layer.

7. The light reflective film of claim 1, further comprising a web layer adjacent the light reflective layer.

8. The light reflective film of claim 7, wherein
   the web layer is a material selected from the group consisting of polyester materials, nylon materials, woven materials, and non-woven materials;
   the transparent film layer is a material selected from the group consisting of polyester materials, nylon materials, and polyvinyl chloride materials; and
   the coating layer is a material selected from the group consisting of polyurethane materials, polycarbonate materials, polystyrene materials, polymethyl methacrylate materials, acrylic materials, and polypropylene materials.

9. The light reflective film of claim 1, wherein the light reflective film is attached to another object for use.

10. A retroreflective device, comprising:

a web layer;

a retroreflective layer on the web layer;

a plurality of transparent objects on the retroreflective layer;

a transparent film layer on the plurality of transparent objects and spaced away from the retroreflective layer by a gap; and a coating layer enclosing the web layer, the retroreflective layer, the plurality of transparent objects, the gap, and the transparent film layer.

11. The retroreflective device of claim 10, wherein the coating layer completely encapsulates the retroreflective device.

12. The retroreflective device of claim 10, wherein the gap is an air gap.

13. The retroreflective device of claim 10, wherein the transparent film layer is supported by the plurality of transparent objects away from the retroreflective layer.

14. The retroreflective device of claim 10, wherein the retroreflective device is flexible.

15. The retroreflective device of claim 10, wherein the coating layer is a material selected from the group consisting of polyurethane materials, polycarbonate materials, polystyrene materials, polymethyl methacrylate materials, acrylic materials, and polypropylene materials.

16. The retroreflective device of claim 10, wherein the coating layer has a lower melting temperature than the transparent film layer.

17. The retroreflective device of claim 10, wherein the web layer is a material selected from the group consisting of polyester materials, nylon materials, woven materials, and non-woven materials;

the transparent film layer is a material selected from the group consisting of polyester materials, nylon materials, and polyvinyl chloride materials; and the coating layer is a material selected from the group consisting of polyurethane materials, polycarbonate materials, polystyrene materials, polymethyl methacrylate materials, acrylic materials, and polypropylene materials.

18. The retroreflective device of claim 10, wherein the retroreflective device is attached to another object for use.

19. A flexible light reflective device, comprising:

a web layer;

a light reflective layer on the web layer;

a plurality of transparent beads on the light reflective layer;

a transparent film layer in contact with the plurality of transparent beads and spaced away from the light reflective layer by an air gap; and a coating layer encapsulating the light reflective device.

20. A light reflective film, comprising:

a light reflective layer;

a plurality of transparent objects on the light reflective layer;

a transparent film layer in contact with the plurality of transparent objects and spaced away from the light reflective layer; and a coating layer covering the transparent film layer;

wherein the coating layer completely encapsulates the light reflective film.

21. A light reflective film, comprising:

a light reflective layer;

a plurality of transparent objects on the light reflective layer;

a transparent film layer in contact with the plurality of transparent objects and spaced away from the light reflective layer; and a coating layer covering the transparent film layer;

wherein the coating layer has a lower melting temperature than the transparent film layer.

22. A light reflective film, comprising:

a light reflective layer;

a web layer adjacent the light reflective layer;

a plurality of transparent objects on the light reflective layer;

a transparent film layer in contact with the plurality of transparent objects and spaced away from the light reflective layer; and a coating layer covering the transparent film layer;

wherein the web layer is a material selected from the group consisting of polyester materials, nylon materials, woven materials, and non-woven materials; and wherein the transparent film layer is a material selected from the group consisting of polyester materials, nylon materials, and polyvinyl chloride materials; and wherein the coating layer is a material selected from the group consisting of polyurethane materials, polycarbonate materials, polystyrene materials, polymethyl methacrylate materials, acrylic materials, and polypropylene materials.

* * * * *